(12) United States Patent
Suzuki et al.

(10) Patent No.: US 7,960,305 B2
(45) Date of Patent: Jun. 14, 2011

(54) POLYMERIZATION CATALYST COMPOSITION AND PROCESS FOR PRODUCTION OF POLYMER

(75) Inventors: Makoto Suzuki, Ichihara (JP); Yoshihisa Inoue, Chiba (JP); Tadahito Nobori, Yokohama (JP); Yoshihiro Yamamoto, Chigasaki (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 670 days.

(21) Appl. No.: 11/884,941

(22) PCT Filed: Feb. 21, 2006

(86) PCT No.: PCT/JP2006/003031
§ 371 (c)(1),
(2), (4) Date: Aug. 23, 2007

(87) PCT Pub. No.: WO2006/090688
PCT Pub. Date: Aug. 31, 2006

(65) Prior Publication Data
US 2008/0177014 A1    Jul. 24, 2008

(30) Foreign Application Priority Data
Feb. 25, 2005   (JP) ................................. 2005-050454

(51) Int. Cl.
*C08F 4/44*      (2006.01)
*B01J 31/18*    (2006.01)

(52) U.S. Cl. ......... 502/167; 526/172; 526/308; 526/347
(58) Field of Classification Search .................. 502/167; 526/172, 308, 347
See application file for complete search history.

(56) References Cited

U.S. PATENT DOCUMENTS

| 7,393,907 B2 * | 7/2008 | Imuta et al. ................... 526/281 |
| 2002/0156196 A1 | 10/2002 | Saito et al. |

FOREIGN PATENT DOCUMENTS

| EP | 1044989 A1 * | 10/2000 |
| JP | 10-509475 A | 9/1988 |
| JP | 2000-355606 A | 12/2000 |
| JP | 2001-514697 A | 9/2001 |
| JP | 2002-003427 A | 1/2002 |
| JP | 2002-249505 A | 9/2002 |
| JP | 2002-540234 A | 11/2002 |
| JP | 2006-036709 A | 2/2006 |
| KR | 1998-703419 A | 11/1998 |
| WO | WO 96/30421 | 10/1996 |
| WO | WO 96/30421 A1 | 10/1996 |
| WO | WO 98/40415 A1 | 9/1998 |
| WO | WO 00/56795 | 9/2000 |
| WO | WO 02/30995 A1 | 4/2002 |

* cited by examiner

*Primary Examiner* — Robert D. Harlan
(74) *Attorney, Agent, or Firm* — Buchanan Ingersoll & Rooney PC

(57) ABSTRACT

A polymerization catalyst composition for a radically polymerizable monomer of the present invention comprises a transition metal-containing phosphazenium composition which is produced by mixing a phosphazenium compound with a compound of a transition metal belonging to Groups 4 to 12 in the periodic table and an organic halogen compound.

14 Claims, No Drawings

POLYMERIZATION CATALYST COMPOSITION AND PROCESS FOR PRODUCTION OF POLYMER

TECHNICAL FIELD

The present invention relates to a new polymerization catalyst composition for a radically polymerizable monomer, a transition metal-containing phosphazenium composition constituting the catalyst composition, a method for manufacturing a polymer using the polymerization catalyst composition and a polymer obtained by this method. In more detail, the present invention relates to a transition metal-containing phosphazenium composition obtained by mixing a phosphazenium compound with a compound of at least one kind of transition metal belonging to Group 4 to Group 12 in the periodic table, a polymerization catalyst composition for a radically polymerizable monomer comprising the transition metal-containing phosphazenium composition and an organic halogen compound, a method for manufacturing a polymer using the polymerization catalyst composition and a polymer obtained by this method.

BACKGROUND ART

Extensive studies have been carried out on radical polymerization in the past. Among them, in recent years, a living radical polymerization method has attracted attention, in which a polymer with a narrow molecular weight distribution is manufactured by arbitrarily and strictly controlling the molecular weight of the polymer obtained or a new polymer (block, graft, star or brush polymers, and the like) is manufactured by copolymerizing several monomers by various methods. Among them, Atom Transfer Radical Polymerization (ATRP) has been widely studied because it can precisely control the polymer structure in various forms. For example, Japanese Patent Laid-Open Publication No. H10-509475 (Patent Document 1) discloses a method for polymerizing a radically polymerizable monomer by using an organic halogen compound as an initiator, a transition metal halide such as copper halides and the like as a catalyst and further bipyridine and the like as a ligand for the transition metal compound. This method, however, uses expensive ligands and may require as much as threefold equivalents of the ligand with respect to the transition metal compound, causing a drawback of high cost in industrial production of the polymers.

On the other hand, Japanese Patent Laid-Open Publication No. 2002-540234 (Patent Document 2) discloses a living radical polymerization method to solve the above drawback. That is a method not to use expensive ligands. Specifically, it is a method to use an organic halogen compound as an initiator and a catalyst composition comprising an onium salt such as tetrabutylammonium bromide and the like and a transition metal halide such as an iron halide and the like, to polymerize a radically polymerizable monomer. This method does not require expensive ligands, but the reaction rate is low and cannot be considered as a favorable industrial process. Patent Document 2 also describes a need to add an expensive ligand (for example, N-(2-pyridylmethyl)methamine and the like) in order to increase the reaction rate.

Further, Japanese Patent Laid-Open Publication 2000-355606 (Patent Document 3) and International Publication No. WO02/30995 Pamphlet (Patent Document 4) disclose a method for manufacturing a polymer by anionic polymerization of a polar unsaturated compound in the presence of a phosphazenium compound, which is one of the component compounds in the polymerization catalyst composition of the present invention. There is, however, a drawback that anionic polymerization is generally susceptible to impurities such as moisture and the like. Accordingly, a catalyst and a polymerization method have not been found yet, which permits use of a radical polymerization method to allow the polymerization even in the presence of moisture and the like, but does not use an expensive ligand to effect the living radical polymerization at a high reaction rate.

Patent Document 1: Japanese Patent Laid-Open Publication No. H10-509475
Patent Document 2: Japanese Patent Laid-Open Publication No. 2002-540234
Patent Document 3: Japanese Patent Laid-Open Publication No. 2000-355606
Patent Document 4: International Publication No. WO02/30995 Pamphlet

DISCLOSURE OF THE INVENTION

Problems to be Solved by the Invention

First object of the present invention is to provide, in the radical polymerization, an industrially inexpensive catalyst component having good living character without particular problem in manufacturing and handling and a polymerization catalyst composition for a radically polymerizable monomer comprising the catalyst component Second object is to provide a method for effectively and efficiently manufacturing a polymer by using the polymerization catalyst composition and by polymerizing a radically polymerizable monomer.

Third object is to provide a polymer obtained by using the polymerization catalyst composition and by polymerizing a radically polymerizable monomer.

Means for Solving the Problems

The present inventors have made extensive studies to achieve the above objects and found that a polymerization catalyst composition comprising a particular transition metal-containing phosphazenium composition is a very effective polymerization catalyst composition, which has high activity in radical polymerization and living character in the polymerization reaction to give a polymer having a narrow molecular weight distribution, thus completing the present invention.

That is, the transition metal-containing phosphazenium composition according to the present invention is a composition obtained by mixing a phosphazenium compound represented by the following general formula (1) with a compound of at least one kind of transition metal belonging to Group 4 to Group 12 in the periodic table represented by the following general formula (2).

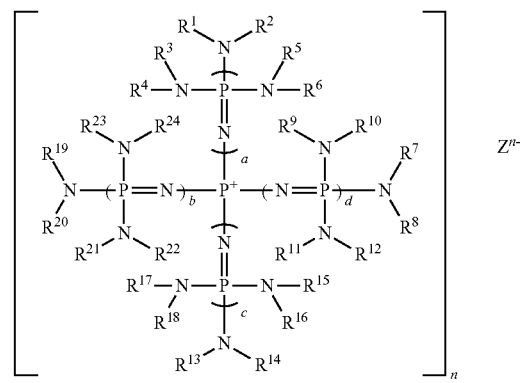

(1)

(In the formula, n is an integer of 1 or more and represents the number of phosphazenium cations and $Z^{n-}$ represents an anion of an active hydrogen compound in a form derived from an active hydrogen compound having n active hydrogen atoms, from which n protons are eliminated. The symbols a, b, c and d each are a positive integer of 3 or less or 0 with the proviso that they are not all 0 simultaneously. $R^1$, $R^2$, $R^3$, $R^4$, $R^5$, $R^6$, $R^7$, $R^8$, $R^9$, $R^{10}$ $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ and $R^{24}$ may be identical or different and represent each a hydrocarbon group having 1 to 10 carbon atoms. $R^1$ and $R^2$, $R^3$ and $R^4$, $R^5$ and $R^6$, $R^7$ and $R^8$, $R^9$ and $R^{10}$, $R^{11}$ and $R^{12}$, $R^{13}$ and $R^{14}$, $R^{15}$ and $R^{16}$, $R^{17}$ and $R^{18}$, $R^{19}$ and $R^{20}$, $R^{21}$ and $R^{22}$, and $R^{23}$ and $R^{24}$ may be linked together to form a ring.)

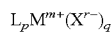
(2)

(In the formula, L represents a neutral ligand, p represents the number of the neutral ligands and is 0 or an integer of from 1 to 8. M represents a transition metal belonging to Group 4 to Group 12 in the periodic table, m represents the valency of transition metal M and is an integer of from 1 to 8. $X^{r-}$ represents an anion in a form derived from deprotonation of an active hydrogen compound, q represents the number of the anions and is an integer of from 1 to 8. The symbol r represents the valency of the anion and is an integer of from 1 to 8. The relationship among m, r and q is represented by m=r×q.)

The polymerization catalyst composition for a radically polymerizable monomer according to the present invention comprises the transition metal-containing phosphazenium composition and an organic halogen compound.

The method for manufacturing a polymer according to the present invention comprises using the above mentioned polymerization catalyst composition for a radically polymerizable monomer as a catalyst composition for manufacturing the polymer by radical polymerization.

The polymer according to the present invention is a polymer obtained by the above-mentioned manufacturing method of the polymer.

Effect of the Invention

Use of the polymerization catalyst composition of the present invention permits living radical polymerization of a radically polymerizable monomer at a faster rate and a lower cost than conventional catalysts.

BEST MODE FOR CARRYING OUT THE INVENTION

The present invention is described in detail in the following.

The transition metal-containing phosphazenium composition of the present invention is obtained by mixing a phosphazenium compound represented by the following general formula (1) with a transition metal compound represented by the following general formula (2). Also, the polymerization catalyst composition for a radically polymerizable monomer of the present invention comprises the transition metal containing-phosphazenium composition and an initiator.

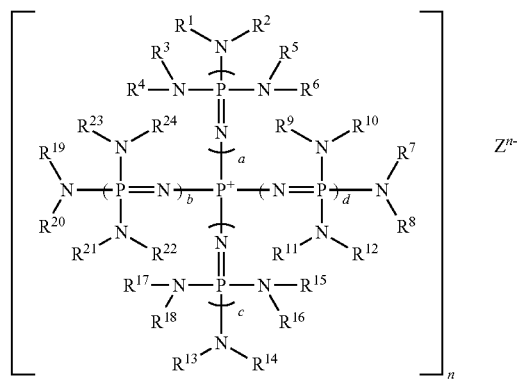

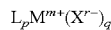

<Phosphazenium Compound>

The phosphazenium compound used in the present invention is represented by a limiting structure of formula (1), in which a positive charge of the phosphazenium cation is localized on the central phosphorous atom, but may include compounds illustrated by countless numbers of limiting structures other than this one, so that its positive charge is actually delocalized throughout the entire molecule.

In the general formula (1), $R^1$, $R^2$, $R^3$, $R^4$, $R^5$, $R^6$, $R^7$, $R^8$, $R^9$, $R^{10}$ $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ and $R^{24}$ may be identical or different and represent each a hydrocarbon group having 1 to 10 carbon atoms.

The hydrocarbon group includes linear or branched alkyl groups having 1 to 10 carbon atoms, for example, methyl, ethyl, 2-butyl, n-pentyl and the like; cycloalkyl groups having 3 to 10 carbon atoms, for example, cyclohexyl and the like; alkenyl groups having 2 to 10 carbon atoms, for example, vinyl, propenyl and the like; cycloalkenyl groups having 3 to 10 carbon atoms, for example, cyclohexenyl and the like; substituted or unsubstituted aryl groups having 6 to 10 carbon atoms, for example, phenyl, naphthyl, ethylphenyl and the like; and others.

Further, in the general formula (1), $R^1$ and $R^2$, $R^3$ and $R^4$, $R^5$ and $R^6$, $R^7$ and $R^8$, $R^9$ and $R^{10}$, $R^{11}$ and $R^{12}$, $R^{13}$ and $R^{14}$, $R^{15}$ and $R^{16}$, $R^{17}$ and $R^{18}$, $R^{19}$ and $R^{20}$, $R^{21}$ and $R^{22}$, and $R^{23}$ and $R^{24}$ may be linked together to form a ring structure. Groups bonding to the nitrogen atom to form a ring structure include alkylene groups having 2 to 10 carbon atoms, for example, ethylene, tetramethylene, pentamethylene and the like; cycloalkylene groups having 3 to 10 carbon atoms, for example, cyclohexylene and the like; alkenylene groups having 2 to 10 carbon atoms, for example, vinylene and the like; cycloalkenylene groups having 3 to 10 carbon atoms, for example, cyclohexenylene and the like; arylene groups having 6 to 10 carbon atoms, for example, phenylene, naphthylene and the like; and aralkylene groups having 8 to 10 carbon atoms, for example, phenylethylene and the like; and others. Such a ring structure may be formed in all nitrogen atoms having groups $R^1$ to $R^{24}$ or in part thereof.

Furthermore, part of hydrogen atoms of the hydrocarbon group represented by $R^1$ to $R^{24}$ may be replaced with a group containing heteroatoms such as oxygen, nitrogen, sulfur or silicon atom and the like or with a halogen atom.

Among these hydrocarbon groups, $R^1$ to $R^{24}$ are preferably linear alkyl groups and ring structure forming-groups each having 1 to 8 carbon atoms, more preferably methyl, ethyl, or propyl group and tetramethylene or pentamethylene group when forming a ring structure, further more preferably methyl or tetramethylene group. Most preferably all the $R^1$ to $R^{24}$ groups are methyl groups.

In the general formula (1), a, b, c and d are each a positive integer of 3 or less or 0 with the proviso that they are not all 0 simultaneously. The symbols a, b, c and d each represent preferably a positive integer of 2 or less, a preferable combination of a, b, c and d includes a combination in which one of a, b, c, and d is 2 while the other three is 1 and a combination in which all a, b, c and d is 1, and a particularly preferable combination is the combination in which all a, b, c and d is 1.

In the general formula (1), n represents the number of the phosphazenium cations. The symbol n represents an integer of 1 or more, preferably an integer of from 1 to 8, more preferably an integer of from 1 to 3.

In the general formula (1), $Z^{n-}$ is an anion of an active hydrogen compound in a form derived from an active hydrogen compound having n active hydrogen atoms, from which n protons are eliminated. The anion of the active hydrogen compound represented by $Z^{n-}$ is not particularly limited, and may include any anions capable of forming an ion pair with the phosphazenium cation. Such active hydrogen compounds yielding $Z^{n-}$ include compounds having active hydrogen atoms on carbon, oxygen, nitrogen or sulfur atoms, mineral acids, superacids and the like. An active hydrogen atom bonded to a carbon atom refers to the one bonded to a carbon atom, which is bonded to an electron-withdrawing group such as —$CO_2R$ (R is a hydrogen atom or alkyl group), —CN, —$NO_2$ or —COR (R is a hydrogen atom or alkyl group) and the like.

Among compounds leading to $Z^{n-}$, compounds having active hydrogen atom(s) on a carbon atom include, for example, carboxylic acid esters such as monocarboxylic acid esters having 3 to 20 carbon atoms, polycarboxylic acid esters having to 20 carbon atoms containing 2 to 4 carboxylic acid ester groups and the like; formyl carboxylic acid esters such as formyl monocarboxylic acid esters having 4 to 20 carbon atoms, formyl polycarboxylic acid esters having 6 to 20 carbon atoms containing 2 to 4 carboxylic acid ester groups and the like; ketocarboxylic acid esters such as ketomonocarboxylic acid esters having 4 to 20 carbon atoms, ketopolycarboxylic acid esters having 7 to 20 carbon atoms containing 2 to 4 carboxylic acid ester groups and the like; nitrites such as mononitriles having 1 to 20 carbon atoms, polynitriles having 3 to 20 carbon atoms containing 2 to 4 cyano groups and the like; ketones such as monoketones having 3 to 20 carbon atoms, polyketones having 4 to 20 carbon atoms containing 2 to 4 carbonyl groups and the like; nitrileoxides having 1 carbon atom; nitrile thioxides having 1 carbon atom, and the like.

Monocarboxylic acid esters having 3 to 20 carbon atoms include aliphatic monocarboxylic acid esters, for example, ethyl acetate, cyclohexyl propionate, isopropyl butyrate, methyl isobutyrate and the like; alicyclic monocarboxylic acid esters, for example, isopropyl cyclohexanecarboxylate and the like; aliphatic monocarboxylic acid esters containing aromatic ring(s), for example, ethyl phenylacetate and the like; and others. Polycarboxylic acid esters having 5 to 20 carbon atoms containing 2 to 4 carboxylic acid ester groups include aliphatic polycarboxylic acid esters, for example, diethyl malonate, diethyl succinate, diethyl adipate, tetrakis (2-ethoxy carbonylethyl)ethylenediamine and the like; alicyclic polycarboxylic acid esters, for example, 1,2-(dimethoxycarbonyl)cyclohexane and the like; aliphatic polycarboxylic acid esters containing aromatic ring(s), for example, diethyl phenylsuccinate and the like; and others.

Formyl monocarboxylic acid esters having 4 to 20 carbon atoms include aliphatic formyl monocarboxylic acid esters, for example, methyl formylacetate, cyclohexyl 3-formylproionate and the like; alicyclic formyl monocarboxylic acid esters, for example, ethyl 2-formyl-1-cyclohexanecarboxylate and the like; formyl monocarboxylic acid esters containing aromatic ring(s), for example, ethyl phenylformylacetate and the like; and others. Formyl polycarboxylic acid esters having 6 to 20 carbon atoms containing 2 to 4 carboxylic acid ester groups include aliphatic formyl polycarboxylic acid esters, for example, dimethyl formylmalonate and the like; alicyclic formyl polycarboxylic acid esters, for example, 1,2-(dimethoxycarbonyl)-1-formylcyclohexane and the like; formyl polycarboxylic acid esters containing aromatic ring(s), for example, diethyl 1-formyl-2-phenylsuccinate and the like; and others.

Ketomonocarboxylic acid esters having 4 to 20 carbon atoms include aliphatic ketomonocarboxylic acid esters, for example, ethyl acetoacetate, cyclopentyl acetoacetate, methyl carbamoylacetate and the like; alicyclic ketomonocarboxylic acid esters, for example, 2-(methoxycarbonyl)cyclohexanone and the like; ketomonocarboxylic acid esters containing aromatic ring(s), for example, ethyl benzoylacetate and the like; and others. Ketopolycarboxylic acid esters having 7 to 20 carbon atoms containing 2 to 4 carboxylic acid ester groups include aliphatic ketopolycarboxylic acid esters, for example, diethyl acetylsuccinate and the like; alicyclic ketopolycarboxylic acid esters, for example, 2,3-diethoxycarbonylcyclohexanone and the like; aliphatic ketopolycarboxylic acid esters containing aromatic ring(s), for example, dimethyl 2-acetyl-3-phenylsuccinate and the like; and others.

Mononitriles having 1 to 20 carbon atoms include aliphatic mononitriles, for example, hydrogen cyanide, acetonitrile, 2-cyanopropane and the like; alicyclic mononitriles, for example, cyclohexylnitrile and the like; aliphatic mononitriles containing aromatic ring(s), for example, phenylacetonitrile and the like; and others. Polynitriles having 3 to 20 carbon atoms containing 2 to 4 cyano groups include aliphatic polynitriles, for example, malonitrile, 1,3-dicyanopropane, adiponitrile and the like; alicyclic polynitriles, for example, 1,2-dicyanocyclohexane and the like; aliphatic polynitriles containing aromatic ring(s), for example, phenylsuccinonitrile and the like; and others.

Monoketones having 3 to 20 carbon atoms include aliphatic ketones, for example, acetone, methyl ethyl ketone and the like; alicyclic ketones, for example, dicyclohexyl ketone and the like; aliphatic ketones containing aromatic ring(s), for example, benzyl acetone and the like; aromatic ketones, for example, acetophenone, isopropyl phenyl ketone and the like; and others. Polyketones having 4 to 20 carbon atoms containing 2 to 4 carbonyl groups include aliphatic polyketones, for example, 2,4-pentanedione and the like; alicyclic polyketones, for example, 1,3-cyclohexanedione and the like; polyketones containing aromatic ring(s), for example, 1-phenyl-2,4-pentanedione and the like; and others. Nitrile oxides having one carbon atom include, for example, hydrogenated nitrile oxide. Nitrile thioxides having one carbon atom include, for example, hydrogenated nitrile thioxide.

Among compounds leading to $Z^{n-}$, compounds having active hydrogen atom(s) on an oxygen atom include, for example, water, carboxylic acids such as monocarboxylic acids having 1 to 20 carbon atoms, polycarboxylic acids having 2 to 20 carbon atoms containing 2 to 6 carboxyl groups and the like; carbamic acids having Ito 20 carbon atoms; sulfonic acids having 1 to 20 carbon atoms; alcohols such as monoalcohols having 1 to 20 carbon atoms, alcohols such as polyols having 2 to 20 carbon atoms containing 2 to 8 hydroxyl groups and the like; phenols such as phenols having 6 to 20 carbon atoms containing 1 to 3 hydroxyl groups and the like; saccharides and derivatives thereof; polyalkylene oxides containing active hydrogens at terminal(s); cyanates having one carbon atom, and the like.

Monocarboxylic acids having 1 to 20 carbon atoms include aliphatic monocarboxylic acids, for example, formic acid, acetic acid, trifluoroacetic acid, stearic acid, oleic acid and the like; aliphatic monocarboxylic acids containing aromatic ring(s), for example, phenylacetic acid and the like; alicyclic monocarboxylic acids, for example, cyclohexanecarboxylic acid and the like; aromatic monocarboxylic acids, for example, benzoic acid, napthalane-2-carboxylic acid and the like; and others.

Polycarboxylic acids having 2 to 20 carbon atoms containing 2 to 6 carboxyl groups include aliphatic polycarboxylic acids, for example, oxalic acid, malonic acid and the like; alicyclic polycarboxylic acids, for example, cyclohexane-1,2-dicarboxylic acid and the like; polycarboxylic acids containing aromatic ring(s), for example, 2-phenylsuccinic acid and the like; aromatic polycarboxylic acids, for example, phthalic acid, trimellitic acid and the like; and others.

Carbamic acids having 1 to 20 carbon atoms include, for example, N,N-diethylcarbamic acid, phenylcarbamic acid, N,N'-dicarboxy-2,4-toluenediamine and the like. Sulfonic acids having 1 to 20 carbon atoms include aliphatic sulfonic acids, for example, methanesulfonic acid and the like; aliphatic sulfonic acid containing heterocyclic ring(s), for example, 2-morpholinoethanesulfonic acid, 3-(N-morpholino)propanesulfonic acid and the like; aromatic sulfonic acids, for example, benzenesulfonic acid, p-toluenesulfonic acid, 4-nitrobenzenesulfonic acid, 4,4'-biphenyldisulfonic acid, 2-naphthalenesulfonic acid, picrylsulfonic acid and the like; heterocyclic sulfonic acids, for example, 3-pyridinesulfonic acid and the like; and others.

Monohydric alcohols having 1 to 20 carbon atoms include aliphatic monohydric alcohols, for example, methanol, allyl alcohol, crotyl alcohol and the like; alicyclic monohydric alcohols, for example, cyclopentanol and the like; aliphatic monohydric alcohols containing aromatic ring(s), for example, benzyl alcohol and the like; and others. Polyols having 2 to 20 carbon atoms containing 2 to 8 hydroxyl groups include aliphatic polyols, for example, ethylene glycol, propylene glycol, diethylene glycol, butanediol, trimethylolpropane, glycerol, diglycerol, pentaerythritol and the like; alicyclic polyols, for example, 1,4-cyclohexanediol and the like; polyols containing aromatic ring(s), for example, 1-phenyl-1,2-ethanediol and the like; and others.

Phenols having 6 to 20 carbon atoms containing 1 to 3 hydroxyl groups include monophenols, for example, phenol, cresol, nitrophenol, chlorophenol, naphthol, 9-phenanthrol, 1-hydroxypyrene and the like; diphenols, for example, catechol, dihydroxynaphthalene, bisphenol A and the like; and others. Saccharides and their derivatives include saccharides, for example, glucose, sorbitol, dextrose, fructose, sucrose and the like; derivates thereof, and the like. Polyalkylene oxides containing active hydrogen(s) at terminals include polyalkylene oxides, for example, polyethylene oxide, polypropylene oxide, a copolymer thereof and the like having the number average molecular weight of 100 to 50000, containing 2 to 8 terminals of which 1 to 8 are hydroxyl groups. Cyanates having 1 carbon atom include hydrogen cyanate.

Among compounds leading to $Z^{n-}$, active hydrogen compounds having active hydrogen atom(s) on a nitrogen atom include, for example, ammonia; amines such as primary amines having 1 to 20 carbon atoms, secondary amines having 2 to 20 carbon atoms, polyamines having 2 to 20 carbon atoms containing 2 to 4 primary or secondary amino groups, saturated cyclic secondary amines having 4 to 20 carbon atoms, unsaturated cyclic secondary amines having 4 to 20 carbon atoms, cyclic polyamines having 4 to 20 carbon atoms containing 2 to 3 secondary amino groups and the like; unsubstituted or N-monosubstituted carboxamides having 2 to 20 carbon atoms, 5 to 7-membered ring cyclic amides, dicarboximides having 4 to 10 carbon atoms; azides having 0 carbon atom; and isocyanides having 1 carbon atom, and the like.

Primary amines having 1 to 20 carbon atoms include aliphatic primary amines, for example, methylamine, ethylamine, propylamine and the like; alicyclic primary amines, for example, cyclohexylamine and the like; aliphatic primary amines containing aromatic ring(s), for example, benzylamine, 1-phenylethylamine and the like; aromatic primary amines, for example, aniline, toluidine and the like; and others.

Secondary amines having 2 to 20 carbon atoms include aliphatic secondary amines, for example, dimethylamine, methylethylamine, dipropylamine and the like; alicyclic secondary amines, for example, dicyclohexylamine and the like; aromatic secondary amines, for example, N-methylaniline, diphenylamine and the like; and others. Polyamines having 2 to 20 carbon atoms containing 2 to 4 primary or secondary amino groups include, for example, ethylenediamine, bis(2-aminoethyl)amine, hexamethylenediamine, tris(2-aminoethyl)amine, N,N'-dimethylethylenediamine and the like.

Saturated cyclic secondary amines having 4 to 20 carbon atoms include, for example, pyrrolidine, piperidine, morpholine and the like. Unsaturated cyclic secondary amines having 4 to 20 carbon atoms include, for example, 3-pyrroline, pyrrole, indole, carbazole, imidazole, pyrazole, purine and the like. Cyclic polyamines having 4 to 20 carbon atoms containing 2 to 3 secondary amino groups include, for example, piperazine, 1,4,7-triazacyclononane and the like.

Unsubstituted or N-monosubstituted carboxamides having 2 to 20 carbon atoms include, for example, acetamide, N-methylpropionamide, N-methylbenzamide, N-ethylstearamide and the like. Five to seven-membered ring cyclic amides include, for example, 2-pyrrolidone, ε-caprolactam and the like.

Dicarboximides having 4 to 10 carbon atoms include, for example, succinimide, maleimide, phthalimide and the like. Azides having 0 carbon atom include hydrogen azide and the like. Isocyanides having 1 carbon atom include hydrogen isocyanide and the like.

Among compounds leading to $Z^{n-}$, active hydrogen compounds having active hydrogen atoms on a sulfur atom include, for example, hydrogen sulfide; thiols such as monothiols having 1 to 20 carbon atoms, polythiols having 2 to 20 carbon atoms and the like; thiophenols such as thiophenols having 6 to 20 carbon atoms and the like; and others.

Monothiols having 1 to 20 carbon atoms include aliphatic monothiols, for example, methanethiol, ethanethiol, allyl mercaptan and the like; aliphatic monothiols containing aromatic ring(s), for example, benzyl mercaptan and the like; alicyclic monothiols, for example, cyclopentyl mercaptan, cyclohexyl mercaptan and the like; and others. Polythiols having 2 to 20 carbon atoms include, for example, 1,2-ethanedithiol, 1,3-propanedithiol, 1,2,3-propanetrithiol, 2,3-bis(mercaptomethyl)-1,4-butanedithiol and the like.

Thiophenols having 6 to 20 carbon atoms include monothiophenols, for example, thiophenol, thiocresol, thionaphthol and the like and dithiophenols, for example, 1,2-benezenedithiol and the like.

Among compounds leading to $Z^{n-}$, mineral acids include hydrogen halides, for example, hydrogen fluoride, hydrogen chloride, hydrogen bromide, hydrogen iodide and the like; boric acid, phosphoric acid, phosphorous acid, hydrogen cyanide, thiocyanic acid, nitric acid, sulfuric acid, carbonic acid, perchloric acid and the like.

Among compounds leading to $Z^{n-}$, superacids include, for example, tetrafluoroboric acid, hexafluorophosphoric acid, hexafluoroantimonic acid, hexafluoroarsenic acid, trifluoromethanesulfonic acid, trifluoromethanesulfonimide, tris(trifluoromethanesulfonyl)methane and the like.

Among these active hydrogen compounds leading to $Z^{n-}$, mineral acids or active hydrogen compounds having active hydrogen atom(s) on an oxygen, nitrogen or sulfur atom or on a carbon atom bonded to electron-withdrawing group(s) are preferred, mineral acids are more preferred and hydrogen chloride, hydrogen bromide or hydrogen iodide are further more preferred.

<Transition Metal Compounds>

The compound of a transition metal belonging to Group 4 to Group 12 in the periodic table used in the present invention is the transition metal compound which acts on the initiator used in the present invention to generate radicals and is capable of polymerizing a radically polymerizable monomer, and is represented by the general formula (2).

$$L_p M^{m+}(X^{r-})_q \qquad (2)$$

In the formula, L represents a neutral ligand, p represents the number of the neutral ligands and is 0 or an integer of from 1 to 8. M represents a transition metal belonging to Group 4 to Group 12 in the periodic table, m represents the valency of transition metal M and is an integer of from 1 to 8. $X^{r-}$ represents an anion in a form derived from deprotonation of an active hydrogen compound, q represents the number of the anions and is an integer of from 1 to 8. The symbol r represents the valency of the anion and is an integer of from 1 to 8. The relationship among m, r and q is represented by m=r×q.

The transition metal M specifically includes Group 4 metals, for example, titanium, zirconium and the like; Group 5 metals, for example, vanadium, niobium and the like; Group 6 metals, for example, chromium, molybdenum and the like; Group 7 metals, for example, manganese and the like; Group 8 metals, for example, iron, ruthenium and the like; Group 9 metals, for example, cobalt and the like; Group 10 metals, for example, nickel, palladium and the like; Group 11 metals, for example, copper and the like; and Group 12 metals, for example, zinc and the like.

Among these transition metals, metals belonging to Groups 7, 8, 9, 10 or 11 in the periodic table are preferred, transition metals belonging to Groups 8 or 11 are more preferred, iron or copper is further more preferred and iron is most preferred.

Anions $X^{r-}$ in the transition metal compound of the general formula (2) specifically includes hydrides (H—) and the anions illustrated as $Z^{n-}$ in the general formula (1).

Among anions $X^{r-}$, preferred anions include halide ions and more preferred ones include chloride, bromide and iodide ions. That is, among the transition metal compounds used in the present invention, the preferred ones include transition metal halides and more preferred ones include transition metal chlorides, bromides and iodides.

The transition metal compounds of the general formula (2) may have a neutral ligand L. The neutral ligand L includes, for example, the one containing carbon, oxygen, nitrogen, sulfur or phosphorous atom(s) and the like.

The neutral ligand L containing carbon atom(s) includes, for example, carbon monoxide, dienes having 4 to 20 carbon atoms; aromatic hydrocarbons having 6 to 20 carbon atoms and the like.

Dienes having 4 to 20 carbon atoms include, for example, cyclopentadiene, cyclooctadiene, norbornadiene and the like. Aromatic hydrocarbons having 6 to 20 carbon atoms include, for example, benzene, naphthalene, pyrene and the like.

The neutral ligand L containing oxygen atom(s) includes water and ethers having 2 to 20 carbon atoms.

Ethers having 2 to 20 carbon atoms include aliphatic ethers, for example, dimethyl ether, dinonyl ether, ethyl octyl ether and the like; alicyclic ethers, for example, tetrahydrofuran, 1,4-dioxane, dicyclohexyl ether and the like; ethers containing aromatic ring(s), for example, dibenzyl ether and the like; aromatic ethers, for example, diphenyl ether, naphthyl phenyl ether and the like; and others.

The neutral ligand L containing nitrogen atom(s) includes, for example, nitrogen molecule, ammonia, tertiary amines having 3 to 20 carbon atoms, polyamines having 6 to 50 carbon atoms containing 2 to 4 tertiary amino groups; aromatic amines having 5 to 30 carbon atoms, and the like.

Tertiary amines having 3 to 20 carbon atoms include aliphatic tertiary amines, for example, trimethylamine, diisopropylmethylamine and the like; alicyclic tertiary amines, for example, N-methylpiperidine and the like; tertiary amines containing aromatic ring(s), for example, diethylbenzylamine and the like; and others. Polyamines having 6 to 50 carbon atoms containing 2 to 4 tertiary amino groups include aliphatic polyamines, for example, tetramethylethylenediamine, N,N,N',N",N"-pentamethyldiethylenetriamine, N,N,N',N',N",N"-hexamethyltriethylenetetramine, N,N,N',N',N",N"-hexakis[(2-n-butoxycarbonyl)ethyl]triethylenetetramine and the like; alicyclic polyamines, for example, 1,2-dipiperidinoethane and the like; tertiary polyamines containing aromatic ring(s), for example, 1,4-dibenzylpiperidine and the like; and others. Aromatic amines having 5 to 30 carbon atoms include aromatic amines, for example, pyridine, dipyridine, 2,2'-bipyridine, 2,2'-[4,4'-bis(5-nonyl)]bipyridine, quinoline, 1,10-phenanthroline and the like.

The neutral ligand L containing sulfur atom(s) includes, for example, thioethers having 2 to 20 carbon atoms; aromatic compounds having 3 to 8 carbon atoms containing sulfur atoms.

Thioethers having 2 to 20 carbon atoms include aliphatic thioethers, for example, dimethyl sulfide and the like; alicyclic thioethers, for example, tetrahydrothiopyran and the like; and thioethers containing aromatic ring(s), for example, dibenzyl sulfide and the like. Aromatic compounds having 3 to 8 carbon atoms containing sulfur atom(s) include, for example, thiophene, thiazole, thianaphthalene and the like, and others.

The neutral ligand L containing phosphorous atom(s) includes, for example, phosphines having 3 to 30 carbon atoms and the like. Phosphines having 3 to 30 carbon atoms include aliphatic phosphines, for example, triethylphosphine, tributoxyphosphine and the like; alicyclic phosphines, for example, 1-ethylphosphinane and the like; phosphines containing aromatic ring(s), for example, triphenylphosphine and the like; and others.

The symbol m in the general formula (2) represents the valency of transition metal M and is an integer of from 1 to 8. The symbol p represents the number of the neutral ligands L and is 0 or an integer of from 1 to 8. The symbol r represents the valency of anion $X^{r-}$ and is an integer of 1 or greater, preferably an integer of from 1 to 8. In the transition metal compounds of the general formula (2), the relationship of m=r×q is held among m, r and q since positive charges of the transition metal ion $M^{m+}$ are balanced with negative charges of the anion $X^{r-}$ to be electrically neutral as a whole. Further, when q or p is 2 or more, each of two or more of the anion X$^{r-}$ or the neutral ligand L may be identical or different.

Furthermore, while the transition metal compound of the general formula (2) is generally a mononuclear transition metal compound containing single central metal, a multinuclear transition metal compound containing two or more identical or different central metals also can be used. The transition metal compound of the general formula (2) may be used in an isolated form or generated in situ by separately adding the transition metal compound and the neutral ligand to the reaction system.

<Organic Halogen Compounds>

The organic halogen compound used in the present invention functions as an initiator to polymerize a radically polymerizable monomer when the polymerization catalyst composition of the present invention is used. The organic halogen compound refers to an organic compound containing at least one or more fluorine, chlorine, bromine or iodine atoms therein.

The organic halogen compound specifically includes, for example, halogenated hydrocarbons, sulfonyl halides, halocarboxylic acid esters, halonitriles, haloketones, haloalcohols, haloethers, halocarboxylic acids, haloaldehydes, haloacyl halides, halocarboxylic anhydrides, halocarboxamides, halogcarboximide, haloamines, halophenols and the like.

Halogenated hydrocarbons include aliphatic tetrahalo-substituted hydrocarbons, for example, carbon tetrachloride, carbon tetrabromide, carbon tetraiodide, bromotrichloromethane and the like; aliphatic trihalo-substituted hydrocarbons, for example, chloroform, bromoform, iodoform, 1,1,1-tribromoethane and the like; aliphatic dihalo-substituted hydrocarbons, for example, dichloromethane, dibromomethane, diiodomethane, 1,1-dibromoethane and the like; aliphatic monohalo-substituted hydrocarbons, for example, methyl bromide, methyl iodide, ethyl bromide, t-butyl bromide and the like; alicyclic dihalo-substituted hydrocarbons, for example, 1,1-dibromocyclohexane and the like; alicyclic monohalo-substituted hydrocarbons, for example, 1-bromo-1-methylcyclohexane and the like; monohalo-substituted hydrocarbons containing aromatic ring(s), for example, (1-chloroethyl)benzene, (1-bromoethyl)benzene, (1-iodoethyl)benzene and the like; dihalo-substituted hydrocarbons containing aromatic ring(s), for example, (1,1-diboromoethyl)benzene and the like; and trihalo-substituted hydrocarbons containing aromatic ring(s), for example, α,α,α-tribromotoluene and the like.

Sulfonyl halides include alkylsulfonyl halides, for example, trichloromethanesulfonyl chloride, trichloromethanesulfonyl bromide, trichloromethanesulfonyl iodide, dichloromethanesulfonyl bromide, chlorosulfonyl bromide, methanesulfonyl chloride, methanesulfonyl bromide, methanesulfonyl iodide and the like; aliphatic sulfonyl halides containing aromatic ring(s), for example, benzylsulfonyl chloride and the like; aromatic sulfonyl halides, for example, benzenesulfonyl chloride and the like; and others.

Halocarboxylic acid esters include aliphatic, alicyclic or aromatic ring-containing α-halocarboxylic acid esters having halogen atom(s) at α-position, for example, methyl bromoacetate, methyl iodoacetate, ethyl chloroacetate, ethyl bromoacetate, ethyl iodoacetate, methyl dibromoacetate, ethyl 2-bromopropionate, ethyl 2-bromo-2-methylproionate, butyl trichloroacetate, diethyl bromomalonate, dimethyl dichloromalonate, ethyl bromosuccinate, dibutyl 2-chloro-3-bromosuccinate, methyl 1-chlorocyclohexanecarboxylate, 3-bromotetrahydropyran-2-one, 3-chlorotetrahydrofuran-2-one, ethyl bromophenylacetate and the like; aliphatic, alicyclic or aromatic ring-containing halocarboxylic acid esters having halogen atom(s) at position(s) other than α-position, for example, ethyl 3-bromopropionate, methyl 4-chlorobutanoate, ethyl 3-bromocyclopentanecarboxylate, butyl 3-bromo-3-phenylpropionate and the like; aliphatic, alicyclic or aromatic ring-containing halocarboxylic acid esters, for example, (1-bromoethyl)acetate, (2-chlorobutyl)propionate, (1-bromoethyl)cyclohexanecarboxylate, (1-bromoethyl)phenylacetate and the like; and others.

Halonitriles include aliphatic, alicyclic or aromatic ring-containing α-halonitriles having halogen atom(s) at α-position include, for example, bromoacetonitrile, bromochloroacetonitrile, 2-bromo-2-methylpropionitrile, trichloroacetonitrile, 1-bromocyclohexanecarbonitrile, 1-chlorocyclopentanecarbonitrile, bromophenylacetonitrile and the like; aliphatic, alicyclic or aromatic ring-containing halonitriles having halogen atom(s) at position(s) other than α-position include, for example, 3-bromopropionitrile, 4-chlorobutyronitrile, 3-chlorocyclohexanecarbonitrile, 3-bromo-2-phenylpropionitrile and the like; and others.

Haloketones include aliphatic haloketones, for example, bromoacetone, 1,1-dichloroacetone, 1,1,1-triiodoacetone, 1-bromo-4-chloro-2-butanone and the like; alicyclic haloketones, for example, 1-acetyl-1-bromocyclohexane, 2-chlorocyclohexanone, 3-bromocyclopentanone and the like; aliphatic haloketones containing aromatic ring(s), for example, 2-chloroacetophenone, 4-bromo-3-phenylbutan-2-one and the like; and others.

Haloalcohols include aliphatic alcohols, for example, 2-chloroethanol, 1-bromobutanol and the like; alicyclic alcohols, for example, 2-chlorocyclohexanol, 1-bromocyclopentanol and the like; haloalcohols containing aromatic ring(s), for example, 2-bromo-2-phenylethanol, 4-chloro-3-phenylbutan-1-ol and the like; and others.

Haloethers include aliphatic haloethers, for example, bis (2-chloroethyl)ether, 1-bromo-1-ethoxybutane and the like; alicyclic haloethers, for example, 2-bromotetrahydrofuran, bis(2-chlorocyclohexyl)ether and the like; haloethers containing aromatic ring(s), for example, 1-bromo-3-(2-phenylethoxy)butane, 1-chloro-1-phenoxyethane and the like; and others.

Halocarboxylic acids include aliphatic halocarboxylic acids, for example, 2-bromoacetic acid, 3-chloropropionic acid and the like; alicyclic halocarboxylic acids, for example, 2-chlorocyclohexanecarboxylic acid, 1-bromocyclopentanecarboxylic acid and the like; halocarboxylic acids containing aromatic ring(s), for example, 2-chlorophenylacetic acid, 3-bromo-2-phenylpropionic acid and the like; and others.

Haloaldehydes include aliphatic haloaldehydes, for example, 2-chloroethanal, 6-bromohexanal and the like; alicylic haloaldehydes, for example, 1-chlorocyclohexanecarbaldehyde, 2-bromocyclopentanecarbaldehyde and the like; aldehydes containing aromatic ring(s), for example, 2-phenyl-2-chloroacetaldehyde, 2-phenyl-3-bromopropionaldehyde and the like; and others.

Haloacyl halides include aliphatic haloacyl halides, for example, chloroacetyl chloride, 3-bromopropionyl bromide, 2-bromo-2-methylpropionyl bromide and the like; alicyclic haloacyl halides, for example, 1-chlorocyclohexanecarbonyl chloride, 2-bromocyclopentanecarbonyl bromide and the like; haloacyl halides containing aromatic ring(s), for example, 2-chloro-2-phenylacetyl chloride, 3-chloro-2-phenylpropionyl bromide and the like; and others.

Halocarboxylic anhydrides include aliphatic halocarboxylic anhydrides, for example, 2-chloroacetic anhydride, chloroacetic propionic anhydride and the like; alicyclic halocarboxylic anhydrides, for example, 1-chlorocyclohexanecarboxylic propionic anhydride, 2-chlorosuccinic anhydride, 3-bromo-1,2-cyclohexanedicarboxylic anhydride and the like; halocarboxylic anhydrides containing aromatic ring(s), for example, phenylacetic chloroacetic anhydride and the like; and others.

Halocarboxamides include aliphatic halocarboxamides, for example, chloroacetamide, 3-bromohexanamide, N-chloromethylacetamide, N,N-bis(2-bromoethyl)butanamide and the like; alicyclic halocarboxamides, for example, 1-chlorocyclohexanamide, 2-bromo-4-butanelactam, N-(2-bromocyclohexyl)acetamide and the like; halocarboxamides containing aromatic ring(s), for example, 2-bromo-2-phenylacetamide, N-(3-iodopropyl)-3-phenylpropanamide, N,N-diphenyl-3-chlorobutanamide and the like; and others.

Halocarboximides include alicyclic halocarboximides, for example, 3-chlorosuccinimide, 1-chloro-1,2-cyclohexanedicarboximide and the like; halocarboximides containing aromatic ring(s), for example, 3-bromo-4-phenylsuccinimide and the like; aromatic halocarboximides, for example, N-(3-chlorobutyl)phthalimide and the like; and others.

Haloamines include aliphatic haloamines, for example, chloromethylamine, 2-bromoethylamine, 3-iodopropylamine, ethylchloromethylamine, bis(3-chloropropyl)amine, tris(4-bromobutyl)amine and the like; alicyclic haloamines, for example, 2-chlorocyclohexylamine, bis(2-bromocyclohexyl)amine, N-methyl-2-chloropiperidine, 2-chlorocyclohexyldimethylamine, 2-chloropyrrolidine, 2-bromopiperidine, 2-chloromorpholine, 4-chloropyrroline and the like; haloamines containing aromatic ring(s), for example, 1-bromo-1-phenylmethylamine, 1-chloro-1-phenylethylamine, benzyl (3-bromopropyl)amine, benzylbis(chloromethyl)amine and the like; aromatic haloamines, for example, 2-chloromethylaniline, N-chloromethylaniline, N-(2-bromoethyl)aniline, N-methyl-N-(3-bromopropyl)aniline, 4-chloromethylpyrrole, 3-bromomethylindole, 2-chloromethylcarbazole, 2-(2-bromoethyl)imidazole, 3-(3-bromopropyl)pyrazole, 2-bromomethylnaphthyridine, 2-chloromethylquinazoline, 2-iodomethylpyrimidine and the like; aliphatic halopolyamines, for example, 1-chloroethylenediamine, bis(2-amino-1-chloroethyl)amine, 2-bromohexamethylenediamine, tris(2-aminoethyl)amine, N,N,N',N", N"-pentakis(chloromethyl)diethylenetriamine and the like; cyclic halopolyamines, for example, 2-chloropiperazine, 2-bromo-1,4,7-triazacyclononane and the like; and others.

Halophenols include, for example, 2-chloromethylphenol, 4-bromomethyl-2-naphthol, 3-bromomethyl-4,4'-biphenyldiol and the like.

The organic halogen compound of the present invention is not limited to those having a low molecular weight, but may include a halogenated polymer compound and a complex compound between an inorganic compound and an organic halogen compound, in which, for example, part of the inorganic compound such as silica gel is modified with the organic halogen compound. Halogenated polymer compounds may include, for example, a polymer having halogen group(s) at the terminal(s) obtained by polymerizing a radically polymerizable monomer using the polymerization catalyst composition of the present invention wherein halogen group(s) are provided at the terminal(s) thereof, a polymer having halogen group(s) at the terminal(s) obtained by polymerizing a radically polymerizable monomer using a living radical polymerization catalyst (composition) other than those of the present invention wherein halogen group(s) are provided at the terminal(s) thereof, or a polymer partly modified with an organic halogen compound wherein the polymer is obtained by the polymerization reaction using a polymerization method other than those in the present invention such as free radical polymerization, polycondensation, coordination polymerization and the like.

The organic halogen compound used in the present invention may further include those generated by transferring a halogen atom of a transition metal halide to radicals generated from thermo or light sensitive radical initiator for example, as shown in formula (3), organic halogen compound (E) formed in a combination of $FeBr_3$ (A) and 2,2'-azobisisobutyronitrile (abbreviated as AIBN hereinafter) (B) as a thermo sensitive radical initiator, wherein radicals (C) generated by thermal cleavage of AIBN (B) abstract a bromine atom from $FeBr_3$.

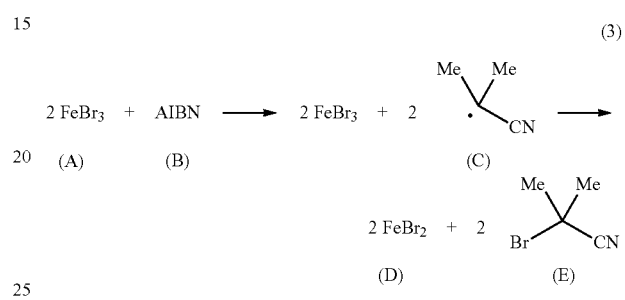

Among these organic halogen compounds, halogenated hydrocarbons, sulfonyl halides, halocarboxylic acid esters, halonitriles and haloketones are preferred, halogenated hydrocarbons, α-halocarboxylic acid esters, sulfonyl halides and α-halonitriles are more preferred and α-halocarboxylic acid esters are further more preferred.

<Method for Preparing Transition Metal-containing Phosphazenium Composition and Polymerization Catalyst Composition>

The transition metal-containing phosphazenium composition of the present invention can be prepared by mixing the phosphazenium compound represented by the above general formula (1) with the transition metal compound represented by the above general formula (2). Also, the polymerization catalyst composition for the radically polymerizable monomer in the present invention can be prepared by mixing the transition metal-containing phosphazenium composition with the organic halogen compound. A mixing method is not particularly limited, and conventionally known mixing methods can be applied.

The transition metal-containing phosphazenium composition is a mixture of the phosphazenium compound and the transition metal compound and part or all thereof may be the reaction products between the phosphazenium compound and the transition metal compound (transition metal-containing phosphazenium compound).

<Method for Manufacturing the Polymer>

The method for manufacturing the polymer of the present invention is characterized by (co)polymerizing a radically polymerizable monomer using the polymerization catalyst composition of the present invention.

<Radically Polymerizable Monomer>

The radically polymerizable monomer used in the method of the present invention includes all monomers with which polymerization proceeds by radical polymerization reaction. Such radically polymerizable monomers specifically include linear or branched olefins having 2 to 30 carbon atoms, for example, ethylene, propylene, isobutylene, 1-nonene and the like; cyclic olefins having 3 to 30 carbon atoms, for example, cyclohexene, cyclopentadiene and the like; dienes, for example, butadiene, 1,5-hexadiene, 1,3-octadiene and the like; (meth)acrylic acids, for example, acrylic acid, methacrylic acid and the like; linear or branched (meth)acrylic acid esters having 4 to 30 carbon atoms, for example, methyl acrylate, methyl methacrylate, ethyl acrylate, propyl methacrylate, butyl acrylate, 2-ethylhexyl methacrylate, lauryl acrylate, stearyl methacrylate, 2,2,2-trifluoroethyl acrylate, 2,2,2-trifluoroethyl methacrylate, 1H,1H,2H,2H-heptadecafluorodecyl acrylate, allyl acrylate, allyl methacrylate, 2-methoxyethyl acrylate, 2-ethoxyethyl methacrylate, 1-methoxy-2-propyl methacrylate, methoxydiethylene glycol acrylate, ethylene glycol diacrylate, propylene glycol dimethacrylate, 1,3-propanediol dimethacrylate, neopentyl glycol diacrylate, glycerol triacrylate, triethylene glycol dimethacrylate, 2-d imethylaminoethyl acrylate, 2-ethylpropylaminoethyl methacrylate and the like; cyclic (meth) acrylic acid esters having 6 to 30 carbon atoms, for example, cyclohexyl methacrylate, tetrahydrofurfuryl acrylate, glycidyl acrylate, glycidyl methacrylate, 2-dicylopentenyloxyethyl acrylate and the like; (meth)acrylic acid esters containing aromatic ring(s) having 9 to 30 carbon atoms, for example, benzyl acrylate, β-phenylethyl methacrylate, 2-phenoxyethyl acrylate, phenoxydipropylene glycol methacrylate, 2-benzoyloxyethyl acrylate and the like; (meth) acrylonitriles, for example, acrylonitrile, methacrylonitrile and the like; linear or branched (meth)acrylamides having 3 to 30 carbon atoms, for example, acrylamide, methacrylamide, N-methylacrylamide, N-butylacrylamide, N-octylacrylamide, N,N-dimethylacrylamide, N,N'-ethylenebisacrylamide, N,N'-diethyl-N,N'-ethylenebisacrylamide and the like; cyclic (meth)acrylamides having 6 to 30 carbon atoms, for example, N-glycidylacrylamide, N,N-diglycidylacrylamide, N-acryloylpiperidine, N-acryloylmorpholine and the like; (meth)acrylamides containing aromatic ring(s) having 9 to 30 carbon atoms, for example, N-phenylacrylamide, N,N-diphenylacrylamide, 1-acryloylimidazole and the like; vinylpyridines, for example, 2-vinylpyridine, 2-isopropenylpyridine, 4-vinylpyridine and the like; unsubstituted or N-aliphatic substituted maleimides, for example, maleimide, N-methylmaleimide, N-cyclohexylmaleimide and the like; N-aromatic substituted maleimides, for example, N-phenylmaleimide, N-(4-methylphenyl)maleimide and the like; linear or branched vinyl ketones having 4 to 30 carbon atoms, for example, methyl vinyl ketone, isopropenyl methyl ketone, ethyl vinyl ketone, ethyl isopropenyl ketone, butyl vinyl ketone and the like; cyclic vinyl ketones having 5 to 30 carbon atoms, for example, cyclohexyl vinyl ketone, 2-cyclohexene methyl ketone and the like; aromatic substituted vinyl ketones, for example, phenyl vinyl ketone and the like; substituted or unsubstituted styrenes having 8 to 30 carbon atoms, for example, styrene, m-methylstyrene, p-methylstyrene, p-t-butylstyrene, p-bromostyrene, p-methoxycarbonylstyrene, p-trifluoromethylstyrene, p-t-butoxycarbonylstyrene, p-cyanostyrene and the like; aromatic vinyl compounds, for example, 2-vinylnaphthalene, 1-vinylphenanthrene, 2-vinylanthracene, 2-vinylfluoranthene, 2-vinylnaphthacene, 2-vinyltrinaphthylene and the like; heteroaromatic vinyl compounds, for example, 3-vinylfuran, 3-vinylthiophene, 2-vinylpyrimidine, 2-vinylquinoline, 3-vinylnaphthyridine, 3-vinylindole, 3-vinylpyrazole, 4-vinylpyrrole, 4-vinylisoxazole, 5-vinylindoline and the like; unsaturated carboxylic anhydrides, for example, maleic anhydride, 1-cyclopentene-1,2-dicarboxylic anhydride, citraconic anhydride, 2,3-diphenylmaleic anhydride, acrylic anhydride, methacrylic anhydride and the like; vinyl esters of aliphatic carboxylic acids, for example, vinyl acetate and the like; vinyl esters of aromatic carboxylic acids, for example, vinyl benzoate and the like; and others.

Among these radically polymerizable monomers, (meth) acrylic acid esters, (meth)acrylonitriles, (meth)acrylamides, vinylpyridines, N-substituted maleimides, vinyl ketones and styrenes are preferably used and (meth)acrylic acid esters and styrenes are more preferably used.

<Method for Manufacturing the Polymer>

In the method for manufacturing the polymer of the present invention, the radically polymerizable monomer may be polymerized singly or a plurality thereof may be copolymerized so far as the polymerization is performed in the presence of the polymerization catalyst composition of the present invention.

In the copolymerization, a method for polymerizing plural radically polymerizable monomers simultaneously, successively or in a repetitive manner of the successive method can be used. When plural radically polymerizable monomers are polymerized simultaneously, a random copolymer may be obtained depending on the difference of reactivity of these monomers, whereas when two or more kinds of monomers are successively polymerized, a block copolymer containing two or more kinds of blocks may be obtained.

The ratio of the weight average molecular weight to the number average molecular weight (Mw/Mn) of the polymer obtained in the method for manufacturing the polymer of the present invention is not particularly limited, and is generally 2.0 or less, more preferably 1.7 or less, further more preferably 1.5 or less.

The mode of the polymerization reaction in the method of the present invention is not particularly limited. Typically, the radically polymerizable monomer is mixed in the presence of the polymerization catalyst composition for the radically polymerizable monomer comprising the organic halogen compound and the transition metal-containing phosphazenium compound obtained by mixing the phosphazenium compound with the transition metal compound in an atmosphere of inert gas such as nitrogen or argon, dissolved in an appropriate solvent if needed, and heated to a desired temperature for polymerization. The manufacturing mode may be a batch process to simultaneously charge each of the components as a whole or a method to intermittently or continuously feed the radically polymerizable monomer. When a copolymer is to be manufactured, a method to intermittently or continuously feed the plural radically polymerizable monomers, simultaneously as a whole or a method to feed them successively may be used depending on desired copolymers.

The amount of the transition metal compound used is not particularly limited, and is generally in a range of from $1 \times 10^{-7}$ to $5 \times 10^{-1}$ mole per mole of a radically polymerizable monomer used, preferably from $1 \times 10^{-4}$ to $3 \times 10^{11}$ mole, more preferably from $5 \times 10^{-4}$ to $1 \times 10^{-1}$ mole. The amount of the phosphazenium compound used is generally 0.05 mole or more relative to 1 mole of the transition metal compound, preferably in a range of from 0.50 to 6.00 moles, more preferably from 0.95 to 4.00 moles. The amount of the organic halogen compound can be appropriately set depending on the molecular weight of the polymer to be manufactured, and is generally in a range of from $1 \times 10^{-4}$ to $5 \times 10^{-1}$ mole, preferably from $5 \times 10^{-4}$ to $2 \times 10^{-1}$ mole, more preferably from $1 \times 10^{-3}$ to $1 \times 10^{-1}$ mole, relative to 1 mole of the radically polymerizable monomer.

The temperature for the polymerization reaction may be appropriately set according to the kind, amount and the like of the phosphazenium compound, transition metal compound, organic halogen compound and the radically polymerizable monomer used, and is generally in a range of from 0° C. to 250° C., preferably 20° C. to 150° C. The pressure for the polymerization reaction may be appropriately set according to the kind and amount of the radically polymerizable monomer used, the reaction temperature and other reaction conditions, and is generally 3.0 MPa (absolute pressure in mega Pascal, likewise hereinafter) or less, preferably 0.01 to 1.5 MPa, more preferably 0.1 to 1.0 MPa.

The reaction time for the polymerization reaction depends on the kind and amount of the phosphazenium compound, transition metal compound, initiator, radically polymerizable monomer used, the reaction temperature and other reaction conditions, and is generally 50 hours or less, preferably 0.1 to 24 hours.

The polymerization reaction in the method of the present invention may be carried out in the absence of a solvent, but an appropriate solvent may be used if needed. The reaction solution may be either homogeneous or heterogeneous The solvent is not particularly limited so far as it does not impair the present invention, and includes, for example, hydrocarbons, aromatic halides, ethers, aprotic polar solvents, alcohols, water and the like.

Hydrocarbons include aliphatic hydrocarbons having 5 to 30 carbon atoms, for example, n-hexane, n-heptane and the like; alicyclic hydrocarbons having 5 to 30 carbon atoms, for example, cyclohexane and the like; aromatic hydrocarbons having 6 to 30 carbon atoms, for example, benzene, toluene, xylene and the like; and others. Aromatic halides include aromatic halides having 6 to 30 carbon atoms, for example, chlorobenzene, dichlorobenzene and the like, and others. Ethers include aliphatic ethers having 2 to 30 carbon atoms, for example, diethyl ether and the like; alicyclic ethers having 10 to 30 carbon atoms, for example, dicyclohexyl ether and the like; aromatic ethers having 12 to 30 carbon atoms, for example, diphenyl ether and the like; cyclic ethers having 3 to 30 carbon atoms, for example, tetrahydrofuran, tetrahydropyran, 1,4-dioxane and the like; polyethers having 3 to 50 carbon atoms, for example, ethylene glycol dimethyl ether, diethylene glycol diethyl ether and the like; and others. Aprotic polar solvents include those, for example, dimethylformamide, dimethylsulfoxide, sulforane, N,N'-dimethylimidazolidinone and the like, and others. Alcohols include aliphatic alcohols having 1 to 30 carbon atoms, for example, methanol, ethanol, propanol and the like; alcohols containing aromatic ring(s) having 6 to 30 carbon atoms, for example, benzyl alcohol and the like; aromatic hydroxyl compounds having 6 to 30 carbon atoms, for example, phenol, cresol and the like; and others. These solvents may be used singly or as a mixture of two or more kinds thereof.

The polymerization may be carried out by any method including bulk, solution, suspension, emulsion polymerization and the like, and any polymerization method can be used so far as it does not impair the effect of the present invention.

The polymer obtained by the method of the present invention may be used without purification, but is generally purified by a conventional purification method for polymers, for example, reprecipitation, solvent evaporation, evaporation of residual monomers, and the like. Further, in order to remove the polymerization catalyst composition used, the method of the present invention may be, in addition to these purification methods, appropriately combined with other methods, for example, a method to adsorb the polymerization catalyst composition on active charcoal, alumina-based absorbents, silica-based absorbents or ion exchange resins, or a method to extract the polymerization catalyst composition in a dilute aqueous mineral acid solution.

<Polymer>

The polymer of the present invention is a polymer obtained by (co)polymerizing a radically polymerizable monomer using the polymerization catalyst composition of the present invention. The structure of the polymer of the present invention is not particularly limited, and a homopolymer, random copolymer, graft copolymer, block copolymer, gradient copolymer, star polymer, comb-shaped polymer and the like may be exemplified.

EXAMPLES

The present invention will be described in more detail with reference to the following Examples, but not limited by them.

All procedures in the following were carried out under a dry nitrogen atmosphere unless described otherwise. Solid reagents were weighed in a globe box replaced with nitrogen and then charged to a reactor. Liquid reagents were added to a reactor by using syringe. Solvents and radically polymerizable monomers were purified by distillation or column chromatography if needed. Radically polymerizable monomers and solvents were bubbled with nitrogen for 30 minutes or longer prior to use. The conversion of each monomer was calculated base on quantitative analysis of gas chromatography using an internal standard. The number average molecular weight (Mn) and the molecular weight distribution (Mw/Mn) of the polymer formed were determined by gel permeation chromatography (GPC) analysis using tetrahydrofuran as an eluent. GPC analysis of polymers of n-butyl acrylate (nBA) and styrene (St) was carried out using polystyrene standards. GPC analysis of polymers of methyl methacrylate (MMA) was carried out using polymethyl methacrylate standards. GPC analysis of random and block copolymers of MMA and nBA was carried out using polystyrene standards.

[Abbreviations]

PZNC1:
Tetrakis[tris(dimethylamino)phosphoranylideneamino]
  phosphonium chloride: $[(Me_2N)_3P=N]_4P^+$, $Cl^-$ (Me represents a methyl group. Likewise hereinafter.)

PZNBr:
Tetrakis[tris(dimethylamino)phosphoranylideneamino]
  phosphonium bromide: $[(Me_2N)_3P=N]_4P^+$, $Br^-$ PZNI:
Tetrakis[tris(dimethylamino)phosphoranylideneamino]
  phosphonium iodide: $[(Me_2N)_3P=N]_4P^+$, $I^-$ PZN(OAc):
Tetrakis[tris(dimethylamino)phosphoranylideneamino]
  phosphonium acetate: $[(Me_2N)_3P=N]_4P^+$, $OAc^-$ (OAC represents an acetoxy group. Likewise hereinafter.)

EBP: Ethyl 2-bromopropionate
EBIB: Ethyl 2-bromoisobutyrate
BEB: (1-bromomethyl)benzene
nBA: n-Butyl acrylate
MMA: Methyl methacrylate
St: Styrene
Mn: Number average molecular weight
Mw: Weight average molecular weight
Mw/Mn: Molecular weight distribution
$Mn_{,th}$: Theoretical number average molecular weight $$Mn_{,th}=Mwi+(Mm/Mi) \times Mwm \times (x/100)$$

Mm: Number of moles of a radically polymerizable monomer charged
Mi: Number of moles of an organic halogen compound charged
Mwi: Molecular weight of an organic halogen compound
Mwm: Molecular weight of a radically polymerizable monomer
x: Conversion of a radically polymerizable monomer (%)

Example 1

(Bulk Polymerization of n-butyl acrylate (nBA) Using PZNCl/FeBr$_2$)

To a Schlenk flask replaced with nitrogen were added 109 mg (0.14 mmol) of tetrakis[tris(dimethylamino)phosphoranylideneamino]phosphonium chloride (PZNCl) as a phosphazenium compound and 30.2 mg (0.14 mmol) of iron (II) bromide as a transition metal compound which had been precisely weighed, to which 3.58 g (27.9 mmol) of nBA as a radically polymerizable monomer, 18.1 μl (0.14 mmol) of ethyl 2-bromopropionate (EBP) as an initiator and 0.2 ml of tridecane as an internal standard for quantitative analysis of gas chromatography were added using a syringe, and the resultant mixture was stirred at room temperature for a few minutes. The reaction mixture was then heated to 90° C. with stirring to carry out the polymerization reaction for 2 hours. After completion of the reaction, the reaction mixture was chilled to 0° C. to terminate the polymerization. The conversion of nBA was 85.1%, and the number average molecular weight (Mn) and the molecular weight distribution (Mw/Mn) of the polymer formed were 19300 and 1.88, respectively. The theoretical molecular weight Mn,$_{th}$ calculated from the conversion of nBA was 21900 and close to Mn of the polymer obtained.

Example 2

(Bulk Polymerization of nBA Using PZNCl/FeBr$_2$)

The reaction and work up were carried out similarly to Example 1 except that 54.3 mg (0.07 mmol) of PZNCl and 15.1 mg (0.07 mmol) of iron (II) bromide were used and the polymerization time was changed to 4 hours.

The conversion of nBA was 38.3%, and the number average molecular weight (Mn) and the molecular weight distribution (Mw/Mn) of the polymer formed were 10400 and 1.41, respectively. The theoretical molecular weight Mn,$_{th}$ calculated from the conversion of nBA was 10000. The molecular weight of the polymer formed was close to the theoretical value and a polymer with a narrow molecular weight distribution was obtained.

Example 3

(Bulk Polymerization of nBA Using PZNCl/FeBr$_2$)

The reaction and work up were carried out similarly to Example 2 except that 109 mg (0.14 mmol) of PZNCl was used.

The conversion of nBA was 70.0%, and the number average molecular weight (Mn) and the molecular weight distribution (Mw/Mn) of the polymer formed were 15600 and 1.64, respectively. The theoretical molecular weight Mn,$_{th}$ calculated from the conversion of nBA was 18100. The molecular weight of the polymer formed was close to the theoretical value and a polymer with a narrow molecular weight distribution was obtained.

Example 4

(Bulk Polymerization of nBA Using PZNCl/FeBr$_2$)

The reaction and work up were carried out similarly to Example 2 except that 9.04 g (70.5 mmol) of nBA was used.

The conversion of nBA was 23.5%, and the number average molecular weight (Mn) and the molecular weight distribution (Mw/Mn) of the polymer formed were 14100 and 1.40, respectively. The theoretical molecular weight Mn,$_{th}$ calculated from the conversion of nBA was 15400. The molecular weight of the polymer formed was close to the theoretical value and a polymer with a narrow molecular weight distribution was obtained.

Example 5

(Bulk Polymerization of nBA Using PZNI/FeBr$_2$)

The reaction and work up were carried out similarly to Example 2 except that 60.7 mg (0.07 mmol) of PZNI was used instead of PZNCl.

The conversion of nBA was 47.7%, and the number average molecular weight (Mn) and the molecular weight distribution (Mw/Mn) of the polymer formed were 10300 and 1.25, respectively. The theoretical molecular weight Mn,$_{th}$ calculated from the conversion of nBA was 12400. The molecular weight of the polymer formed was close to the theoretical value and a polymer with a narrow molecular weight distribution was obtained.

Example 6

(Bulk Polymerization of nBA Using PZNI/FeBr$_2$)

The reaction and work up were carried out similarly to Example 5 except that 121 mg (0.14 mmol) of PZNI was used and the polymerization was carried out for 6 hours.

The conversion of nBA was 83.3%, and the number average molecular weight (Mn) and the molecular weight distribution (Mw/Mn) of the polymer formed were 19500 and 1.18, respectively. The theoretical molecular weight Mn,$_{th}$ calculated from the conversion of nBA was 21500. The molecular weight of the polymer formed was close to the theoretical value and a polymer with a narrow molecular weight distribution was obtained.

Comparative Example 1

(Bulk Polymerization of nBA Without Use of the Phosphazenium Compound)

The Reaction and work up were carried out similarly to Example 1 except that the phosphazenium compound was not used. The conversion of nBA was 0% and no polymer was obtained at all. Polymerization did not proceed at all without use of the phosphazenium compound.

Comparative Example 2

(Bulk Polymerization of nBA Using Ammonium Salt/FeBr$_2$)

The reaction and work up were carried out similarly to Example 1 except that tetrabutylammonium chloride was used instead of the phosphazenium compound and the polymerization was carried out for 8.5 hours.

The conversion of nBA was 16.2%, and the polymerization rate was much slower than the one using the phosphazenium compound. The number average molecular weight (Mn) and the molecular weight distribution (Mw/Mn) of the polymer formed were 5300 and 1.39, respectively. Mn,$_{th}$ calculated from the conversion of nBA was 4300.

Example 7

(Bulk Polymerization of Styrene (St) Using PZNCl/FeBr$_2$)

To a Schlenk flask replaced with nitrogen were mixed 67.8 mg (0.0875 mmol) of PZNCl and 18.9 mg (0.0875 mmol) of iron (II) bromide which had been precisely weighed, to which 3.64 g (34.9 mmol) of St, 23.8 μl (0.17 mmol) of BEB and 0.2 ml of o-xylene as an internal standard for quantitative analysis of gas chromatography were added using a syringe, and the resulting mixture was stirred at room temperature for a few minutes. The reaction mixture was then heated to 110° C. with stirring to carry out the polymerization reaction for 4 hours. After completion of the reaction, the reaction mixture was chilled to 0° C. to terminate the polymerization.

The conversion of St was 48.8%, and the number average molecular weight (Mn) and the molecular weight distribution (Mw/Mn) of the polymer obtained were 9700 and 1.14, respectively. $Mn_{,th}$ calculated from the conversion of St was 10300. The molecular weight of the polymer was close to the theoretical value and a polymer with a narrow molecular weight distribution was obtained.

Example 8

(Bulk Polymerization of St Using PZNI/FeBr$_2$)

The reaction and work up were carried out similarly to Example 7 except that 75.8 mg (0.0875 mmol) of PZNI was used instead of PZNCl.

The conversion of St was 38.9%, and the number average molecular weight (Mn) and the molecular weight distribution (Mw/Mn) of the polymer obtained were 6800 and 1.13, respectively. $Mn_{,th}$ calculated from the conversion of St was 8300. The molecular weight of the polymer was close to the theoretical value and a polymer with a narrow molecular weight distribution was obtained.

Example 9

(Bulk Polymerization of Methyl Methacrylate (MMA) Using PZNCl/FeBr$_2$)

To a Schlenk flask replaced with nitrogen were added 83.0 mg (0.107 mmol) of PZNCl and 23.0 mg (0.107 mmol) of iron (II) bromide which had been precisely weighed, to which 4.10 g (40.9 mmol) of MMA, 31.7 µl (0.213 mmol) of EBIB and 0.2 ml of tridecane as an internal standard for quantitative analysis of gas chromatography were added using a syringe, and the resulting mixture was stirred at room temperature for a few minutes. The reaction mixture was then heated to 70° C. with stirring to carry out the polymerization reaction for 4 hours. After completion of the reaction, the reaction mixture was chilled to 0° C. to terminate the polymerization.

The conversion of MMA was 48.5%, and the number average molecular weight (Mn) and the molecular weight distribution (Mw/Mn) of the polymer formed were 9500 and 1.45, respectively. $Mn_{,th}$ calculated from the conversion of MMA was 9500. The molecular weight of the polymer obtained was close to the theoretical value and a polymer with a narrow molecular weight distribution was obtained.

Example 10

(Solution Polymerization of MMA Using PZNCl/FeBr$_2$)

To a Schlenk flask replaced with nitrogen were mixed 72.5 mg (0.0935 mmol) of PZNCl and 20.2 mg (0.0935 mmol) of iron (II) bromide which had been precisely weighed, to which 3.66 g (36.6 mmol) of MMA, 27.8 µl (0.187 mmol) of EBIB, 4 ml of o-xylene as a solvent and 0.2 ml of tridecane as an internal standard for quantitative analysis of gas chromatography were added using a syringe, and the resulting mixture was stirred at room temperature for a few minutes. A small amount of this solution was withdrawn before polymerization as a sample, which was analyzed for MMA. The reaction mixture was then heated to 80° C. with stirring to carry out the polymerization reaction for 4 hours. After completion of the reaction, the reaction mixture was chilled to 0° C. to terminate the polymerization.

The conversion of MMA was 49.6%, and the number average molecular weight (Mn) and the molecular weight distribution (Mw/Mn) of the polymer formed were 9600 and 1.47, respectively. $Mn_{,th}$ calculated from the conversion of MMA was 9900. The molecular weight of the polymer obtained was close to the theoretical value and a polymer with a narrow molecular weight distribution was obtained.

Example 11

(Solution Polymerization of MMA Using PZNI/FeBr$_2$)

The reaction and work up were carried out similarly to Example 10 except that 81.0 mg (0.0935 mmol) of PZNI was used instead of PZNCl.

The conversion of MMA was 64.8%, and the number average molecular weight (Mn) and the molecular weight distribution (Mw/Mn) of the polymer formed were 13200 and 1.35, respectively. $Mn_{,th}$ calculated from the conversion of MMA was 14200. The molecular weight of the polymer obtained was close to the theoretical value and a polymer with a narrow molecular weight distribution was obtained.

Example 12

(Solution Polymerization of MMA Using PZN(OAc)/FeBr$_2$)

The reaction and work up were carried out similarly to Example 10 except that 74.7 mg (0.0935 mmol) of PZN (OAc) was used instead of PZNCl.

The conversion of MMA was 45.7%, and the number average molecular weight (Mn) and the molecular weight distribution (Mw/Mn) of the polymer formed were 11400 and 1.47, respectively. $Mn_{,th}$ calculated from the conversion of MMA was 9300. The molecular weight of the polymer obtained was close to the theoretical value and a polymer with a narrow molecular weight distribution was obtained.

Example 13

(Random Copolymerization of MMA and nBA Using PZNI/FeBr$_2$)

To a Schlenk flask replaced with nitrogen were added 121 mg (0.140 mmol) of PZNI and 30.2 mg (0.140 mmol) of iron (II) bromide which had been precisely weighed, to which 3.68 g (28.7 mmol) of nBA, 2.65 g (26.5 mmol) of MMA, 36.4 µl (0.28 mmol) of EBP as an initiator and 0.2 ml of tridecane as an internal standard for quantitative analysis of gas chromatography were added using a syringe, and the resulting mixture was stirred at room temperature for a few minutes. The reaction mixture was then heated to 90° C. with stirring to carry out the polymerization reaction for 4 hours. After completion of the reaction, the reaction mixture was chilled to 0° C. to terminate the polymerization. The reaction mixture was diluted with tetrahydrofuran and the solution was passed through a neutral alumina column to remove the polymerization catalyst composition. The filtrate was then added dropwise to a mixed solvent of water/methanol to precipitate the polymer. The polymer precipitated was collected by filtration and dried under vacuum to yield the polymer as white powder.

The conversions of MMA and nBA were 74.4% and 41.6%, respectively. The number average molecular weight (Mn) and the molecular weight distribution (Mw/Mn) of the polymer formed were 10800 and 1.33, respectively. $Mn_{,th}$ calculated from the conversions of MMA and nBA was 12700. The molecular weight of the polymer obtained was close to the theoretical value and a polymer with a narrow molecular weight distribution was obtained.

The results of the measurement of $^1$H-NMR of the polymer obtained indicate that the polymer is composed of MMA and nBA in a molar ratio of 61/39. The molar ratio of the polymer calculated from the conversions of MMA and nBA was MMA/nBA=62/38, indicating that the polymer of the present Example contained MMA and nBA in a ratio close to the theoretical value.

Example 14

(Block Copolymerization of MMA and nBA Using PZNI/FeBr$_2$)

To a Schlenk flask replaced with nitrogen were added 60.7 mg (0.07 mmol) of PZNI and 15.1 mg (0.07 mmol) of iron (II) bromide which had been precisely weighed, to which 3.53 g (27.5 mmol) of nBA as a first monomer, 18.2 μl (0.14 mmol) of EBP and 0.2 ml of tridecane as an internal standard for quantitative analysis of gas chromatography were added using a syringe, and the resulting mixture was stirred at room temperature for a few minutes. The reaction mixture was then heated to 90° C. with stirring to carry out the polymerization reaction. One hour after initiation of the polymerization, part of the reaction solution was withdrawn for analysis, from which the conversion of nBA was found to be 17.7%, and Mn and Mw/Mn of the polymer obtained were found to be 5400 and 1.35, respectively. To the reaction solution was further added 3.70 g (36.9 mmol) of MMA as a second monomer to continue the polymerization at 90° C. for 4 hours. After completion of the polymerization reaction, the reaction mixture was chilled to 0° C. to terminate the polymerization. The reaction mixture was diluted with tetrahydrofuran and then the solution was passed through a neutral alumina column to remove the polymerization catalyst composition. The filtrate was then added dropwise to a mixed solvent of water/methanol to precipitate the polymer. The polymer precipitated was collected by filtration and dried under vacuum to yield the polymer as white powder.

The conversions of MMA and nBA were 55.5% and 34.1%, respectively. The number average molecular weight (Mn) and the molecular weight distribution (Mw/Mn) of the polymer obtained were 28900 and 1.30, respectively. Mn$_{,th}$ calculated from the conversions of MMA and nBA was 23600. The molecular weight of the polymer obtained was close to the theoretical value and a polymer with a narrow molecular weight distribution was obtained.

The results of the measurement of $^1$H-NMR of the polymer obtained indicate that the polymer is composed of MMA and nBA in a molar ratio of 71/29. The molar ratio of the polymer calculated from the conversions of MMA and nBA was MMA/nBA=0.69/31, indicating that the polymer of the present Example contained MMA and nBA in a ratio close to the theoretical value.

Example 15

(Bulk Polymerization of nBA Using PZNBr/FeCl$_2$.4H$_2$O)

The reaction and work up were carried out similarly to Example 1 except that 459.0 mg (0.56 mmol) of PZNBr instead of PZNCl and 27.8 mg (0.14 mmol) of iron (II) chloride tetrahydrate instead of iron (II) bromide were used and the polymerization time was changed to 6 hours.

The conversion of nBA was 33.7%, and the number average molecular weight (Mn) and the molecular weight distribution (Mw/Mn) of the polymer obtained were 10100 and 1.40, respectively. Mn$_{,th}$ calculated from the conversion of nBA was 8800. The molecular weight of the polymer was close to the theoretical value and a polymer with a narrow molecular weight distribution was obtained.

Example 16

(Bulk Polymerization of nBA Using PZNBr/FeBr$_2$.4H$_2$O)

The reaction and work up were carried out similarly to Example 1 except that 229.5 mg (0.28 mmol) of PZNBr instead of PZNCl and 20.1 mg (0.07 mmol) of iron (II) bromide tetrahydrate instead of iron (II) bromide were used and the polymerization time was changed to 6 hours.

The conversion of nBA was 65.7%, and the number average molecular weight (Mn) and the molecular weight distribution (Mw/Mn) of the polymer formed were 16300 and 1.45, respectively. Mn$_{,th}$ calculated from the conversion of nBA was 16900. The molecular weight of the polymer obtained was close to the theoretical value and a polymer with a narrow molecular weight distribution was obtained.

Example 17

(Bulk Polymerization of St Using PZNCl/FeBr$_2$)

The reaction and work up were carried out similarly to Example 7 except that 527.2 mg (0.68 mmol) of PZNCl, 36.7 mg (0.17 mmol) of iron (II) bromide and 35.4 g (340 mmol) of St were used and the polymerization time was changed to 10 hours.

The conversion of St was 51.6%, and the number average molecular weight (Mn) and the molecular weight distribution (Mw/Mn) of the polymer formed were 93800 and 1.50, respectively. Mn$_{,th}$ calculated from the conversion of St was 107700. The molecular weight of the polymer obtained was close to the theoretical value and a polymer with a narrow molecular weight distribution was obtained.

Example 18

(Solution Polymerization of MMA Using PZNI/FeBr$_2$)

The reaction and work up were carried out similarly to Example 11 except that 13.0 μl (0.183 mmol) of bromoacetonitrile was used instead of EBIB.

The conversion of MMA was 60.1%, and the number average molecular weight (Mn) and the molecular weight distribution (Mw/Mn) of the polymer obtained were 12800 and 1.30, respectively. Mn$_{,th}$ calculated from the conversion of MMA was 12000. The molecular weight of the polymer was close to the theoretical value and a polymer with a narrow molecular weight distribution was obtained.

Example 19

(Solution Polymerization of MMA Using PZNI/FeBr$_2$)

The reaction and work up were carried out similarly to Example 11 except that 14.5 μl (0.183 mmol) of methanesulfonyl chloride was used instead of EBIB.

The conversion of MMA was 58.3%, and the number average molecular weight (Mn) and the molecular weight distribution (Mw/Mn) of the polymer obtained were 11500 and 1.38, respectively. Mn$_{,th}$ calculated from the conversion of MMA was 11600. The molecular weight of the polymer was close to the theoretical value and a polymer with a narrow molecular weight distribution was obtained.

INDUSTRIAL APPLICABILITY

The present invention provides a polymerization catalyst composition with excellent living character for a radically polymerizable monomer, a living polymer using the composition, and various industrial resin products.

The invention claimed is:

1. A polymerization catalyst composition for a radically polymerizable monomer comprising a transition metal-containing phosphazenium composition obtained by mixing a phosphazenium compound represented by the following general formula (1) with at least one kind of compound of a transition metal belonging to Group 4 to Group 12 in the periodic table represented by the following general formula (2),

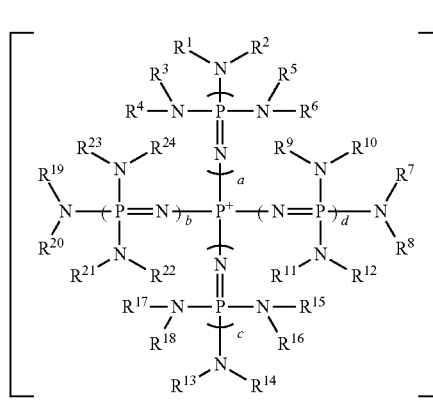

(1)

(wherein in the formula, n is an integer of 1 or more and represents the number of phosphazenium cations and $Z^{n-}$ represents an anion of an active hydrogen compound in a form derived from an active hydrogen compound having n active hydrogen atoms, from which n protons are eliminated; a, b, c and d are each a positive integer of 3 or less or 0 with the proviso that they are not all 0 simultaneously; $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$ and $R^{18}$, $R^{19}$, $R^{20}$, $R^{21}$, $R^{22}$, $R^{23}$ and $R^{24}$ may be identical or different and each represent a hydrocarbon group having 1 to 10 carbon atoms; $R^1$ and $R^2$, $R^3$ and $R^4$, $R^5$ and $R^6$, $R^7$ and $R^8$, $R^9$ and $R^{10}$, $R^{11}$ and $R^{12}$, $R^{13}$ and $R^{14}$, $R^{15}$ and $R^{16}$, $R^{17}$ and $R^{18}$, $R^{19}$ and $R^{20}$, $R^{21}$ and $R^{22}$, $R^{23}$ and $R^{24}$ may be linked together to form a ring);

(2)

(wherein in the formula, L represents a neutral ligand, p represents the number of neutral ligands and is 0 or an integer of from 1 to 8; M represents a transition metal belonging to Group 4 to Group 12 in the periodic table, m represents the valency of transition metal M and is an integer of from 1 to 8; $X^{r-}$ represents an anion in a form derived from deprotonation of an active hydrogen compound, q represents the number of anions and is an integer of from 1 to 8; r represents the valency of the anion and is an integer of from 1 to 8; and the relationship among m, r and q is represented by m=r×q), and an organic halogen compound.

2. The polymerization catalyst composition according to claim 1, wherein all of $R^1$ to $R^{24}$ in the general formula (1) are a methyl group.

3. The polymerization catalyst composition according to claim 1, wherein all of a, b, c and d in the general formula (1) are 1.

4. The polymerization catalyst composition according to claim 1, wherein $Z^{n-}$ in the general formula (1) is an anion in a form derived from deprotonation of a mineral acid.

5. The polymerization catalyst composition according to claim 4, wherein $Z^{n-}$ in the general formula (1) is a chloride, bromide or iodide ion.

6. The polymerization catalyst composition according to claim 1, wherein $Z^{n-}$ in the general formula (1) is an anion in a form derived from deprotonation of an active hydrogen compound having active hydrogen atom(s) on an oxygen, nitrogen or sulfur atom or a carbon atom bonded to electron-withdrawing group(s).

7. The polymerization catalyst composition according to claim 1, wherein the transition metal belongs to Groups 7, 8, 9, 10 or 11 in the periodic table.

8. The polymerization catalyst composition according to claim 7, wherein the transition metal is copper or iron.

9. The polymerization catalyst composition according to claim 1, wherein the transition metal compound is a chloride, bromide or iodide of the transition metal.

10. The polymerization catalyst composition according to claim 1, wherein the organic halogen compound is a halogenated hydrocarbon, sulfonyl halide, α-halocarboxylic acid ester, α-halonitrile or α-haloketone.

11. A method for manufacturing a polymer, wherein radically polymerizable monomer(s) is(are) (co)polymerized in the presence of the polymerization catalyst composition according to claim 1.

12. The method for manufacturing a polymer according to claim 11, wherein the radically polymerizable monomer is a (meth)acrylic acid ester, (meth)acrylonitrile, (meth)acrylamide, vinylpyridine, N-substituted maleimide, vinyl ketone or styrene compound.

13. The method for manufacturing a polymer according to claim 11, wherein the ratio of the weight average molecular weight to the number average molecular weight of the polymer obtained is 2.0 or less.

14. A polymer obtained by the method for manufacturing a polymer according to claim 11.

* * * * *